United States Patent
Watanabe et al.

(10) Patent No.: US 9,514,922 B2
(45) Date of Patent: Dec. 6, 2016

(54) MASS ANALYSIS DATA PROCESSING APPARATUS

(71) Applicant: Shimadzu Corporation, Kyoto (JP)

(72) Inventors: Jun Watanabe, Kyoto (JP); Takashi Sumiyoshi, Kyoto (JP)

(73) Assignee: SHIMADZU CORPORATION, Kyoto-Shi, Kyoto (JP)

( * ) Notice: Subject to any disclaimer, the term of this patent is extended or adjusted under 35 U.S.C. 154(b) by 698 days.

(21) Appl. No.: 13/905,535

(22) Filed: May 30, 2013

(65) Prior Publication Data

US 2013/0338935 A1    Dec. 19, 2013

Related U.S. Application Data

(63) Continuation-in-part of application No. PCT/JP2010/071337, filed on Nov. 30, 2010.

(51) Int. Cl.
  *G01N 31/00* (2006.01)
  *H01J 49/00* (2006.01)
  *G06K 9/00* (2006.01)

(52) U.S. Cl.
  CPC ......... *H01J 49/0027* (2013.01); *G06K 9/0053* (2013.01); *H01J 49/0036* (2013.01)

(58) Field of Classification Search
  CPC ............. G01N 30/7206; G01N 30/8682; H01J 49/0422; H01J 49/0036; H01J 49/004
  USPC ................................ 702/22–25; 250/281–283
  See application file for complete search history.

(56) References Cited

U.S. PATENT DOCUMENTS

| | | | |
|---|---|---|---|
| 8,519,327 B2 * | 8/2013 | Izumi | 250/281 |
| 2006/0284069 A1 | 12/2006 | Le Blanc | |
| 2007/0019185 A1 | 1/2007 | Hamamatsu et al. | |

FOREIGN PATENT DOCUMENTS

| | | |
|---|---|---|
| JP | 2002-071310 | 3/2002 |
| JP | 2005-077094 | 3/2005 |
| JP | 2005302622 | 10/2005 |
| JP | 2007-024737 | 2/2007 |
| JP | 2008-226095 | 9/2008 |
| JP | 2008-542767 | 11/2008 |

(Continued)

OTHER PUBLICATIONS

Domestic Re-publication of PCT International Publication No. WO2009/011011.

(Continued)

*Primary Examiner* — An Do
(74) *Attorney, Agent, or Firm* — Morgan, Lewis & Bockius LLP

(57) ABSTRACT

In the case where a peak on a mass spectrum is saturated due to, for example, signal saturation in a detector or an amplifier provided downstream thereof, a data processor performs fitting with a Gaussian function using data included in the rising part and the falling part (range A) of the peak which are not affected by the saturation, to thereby obtain a desired approximate peak shape B. Then, a mass spectrum in which the saturated peak is replaced with the approximate peak thus obtained is created, the mass-to-charge ratio of the peak top is calculated for this mass spectrum, and this mass spectrum is then displayed on a display screen. Moreover, an extracted ion chromatogram is created on the basis of information on mass-to-charge ratio to intensity of this modified mass spectrum and displayed.

9 Claims, 6 Drawing Sheets

(56) References Cited

FOREIGN PATENT DOCUMENTS

JP       2008-309733 A    12/2008
JP       2010-025749       2/2010
WO    WO-2006/130983    12/2006

OTHER PUBLICATIONS

Accurate Mass Measurement of High-Concentration Sample using LCMS-IT-TOF, Technical Report No. 27.
GCMS Solution, Operation Q&A, Q: how to perform an averaging process on mass spectra (Inquiry No. 0620).
Written Opinion dated Jan. 18, 2011 for International Patent Application No. PCT/JP2010/071337 filed on Nov. 20, 2010.
International Search Report dated Jan. 18, 2011 for International Patent Application No. PCT/JP2010/071337 filed on Nov. 20, 2010.
International Preliminary Report on Patentability dated Jun. 4, 2013 for International Patent Application No. PCT/JP2010/071337 filed on Nov. 20, 2010.

* cited by examiner

MASS ANALYSIS DATA PROCESSING APPARATUS

TECHNICAL FIELD

The present invention relates to a mass analysis data processing apparatus that processes data obtained by a mass spectrometer. More particularly, the present invention relates to a data processing apparatus suited to process data collected by a chromatograph mass spectrometer such as a gas chromatograph mass spectrometer (GC/MS) or a liquid chromatograph mass spectrometer (LC/MS), which is configured by combining a chromatograph such as a gas chromatograph (GC) or a liquid chromatograph (LC) with a mass spectrometer including an $MS^n$ mass spectrometer.

BACKGROUND ART

In general, in a qualitative analysis using a mass spectrometer, the mass-to-charge ratio of a peak appearing on a mass spectrum obtained in actual measurement on a sample is compared with a molecular weight obtained from a composition formula of a known compound, whereby it is determined whether or not the compound is contained in the sample. Further, in an analysis using a mass spectrometer with high mass resolution and high mass accuracy, such as a time-of-flight mass spectrometer (hereinafter, abbreviated as "TOFMS"), the mass-to-charge ratio of a peak appearing on a mass spectrum obtained in actual measurement is compared with the monoisotopic mass of a compound, whereby the structure of the compound can be estimated. Still further, the intensity pattern of an isotope peak appearing on a mass spectrum is used to estimate the structure of a compound. Still further, in an analysis using an $MS^n$ mass spectrometer, a target ion is dissociated one or more times, the generated ions are subjected to mass analysis to obtain an $MS^n$ spectrum, and the mass-to-charge ratio and the intensity pattern of a peak on the $MS^n$ spectrum thus obtained are used to analyze the structure of a compound with a high molecular weight, such as proteins and peptides.

In the case where a high-concentration sample is measured using a mass spectrometer, particularly, a mass spectrometer with high mass resolution and high mass accuracy, a signal may be saturated in a detector, or an input signal may fall outside of the input range of an analog/digital converter, a time/digital converter, and the like which convert a detection signal from the detector into a digital value, with the result that the peak intensity may be saturated on a mass spectrum. If such saturation of the peak intensity occurs, the accuracy of mass calculated from the barycentric position or the like of the peak waveform may become lower, and the reproducibility of an isotope peak pattern appearing on the mass spectrum may become lower.

The upper graph of FIG. 3 is a chromatogram (total ion chromatogram) acquired by a conventional liquid chromatograph mass spectrometer (LC/MS), and the lower two graphs of FIG. 3 are mass spectra at a time point t1 and a time point t2 within the time range of one peak originating from the same component in the chromatogram above. In the mass spectrum at the time point t1 near a peak top on the chromatogram, a peak P1 originating from the target component is saturated. In such a state, a mass-to-charge ratio M1 calculated from the peak P1 is unfavorably different from a mass-to-charge ratio M2 calculated from a peak P2 on the mass spectrum at the time point t2 at which saturation does not occur. If such a decrease in mass accuracy occurs, compound identification based on a mass spectrum becomes difficult, or incorrect identification may occur.

The most common method for avoiding such a trouble during measurement of a high-concentration sample as described above involves diluting the sample or adjusting the sample introduction amount, and measuring the sample again. Unfortunately, this method cannot be adopted in the case where the sample is not left for the remeasurement, and is not suitable for the case where the sample is very precious and expensive.

Non-Patent Document 1 discloses the following method. In an ion trap time-of-flight mass spectrometer, in the case where the concentration of a sample is high, the ion storage time at an ion trap is shortened, and the amount of ions used for mass spectrometry is thus reduced, whereby saturation of a peak intensity is avoided. Further, Patent Document 1 discloses the following method. In a MALDI time-of-flight mass spectrometer, in the case where excessive generation of ions is detected on the basis of a change in potential of a sample plate, a lens voltage is controlled such that the ion pass efficiency of an ion lens decreases, and the amount of ions used for mass spectrometry is thus reduced, whereby saturation of a peak intensity is avoided.

As described above, the methods for reducing the amount of ions used for mass spectrometry are effective to avoid saturation of a peak intensity. However, for example, according to the former method, the sensitivity to all ions that are stored in the ion trap in one cycle decreases. Hence, in the case where a low-concentration component exists on a chromatogram at a position temporally close to a high-concentration component, the sensitivity to the low-concentration component also decreases, and the low-concentration component may not be detected. Similarly, according to the latter method, the sensitivity to other ions that pass through the ion lens before and after ions corresponding to a particular high-concentration component pass through the ion lens inevitably decreases, so that the other ions may not be detected. Further, in both the methods, if an optimal control should be performed taking various elements such as the kind of analysis target sample and measurement conditions into consideration, the control should be unfavorably complicated.

In a qualitative analysis using a LC/MS or a GC/MS including a quadrupole mass spectrometer with a quadrupole mass filter, the quadrupole mass spectrometer performs scan measurement, and a mass spectrum over a predetermined mass-to-charge ratio range is repetitively acquired. The patterns of the mass spectra are compared with mass spectrum patterns stored in a spectrum database (library). Thus, a compound having a high degree of similarity in pattern is extracted, and a compound corresponding to a peak on a chromatogram is identified. In the case where a sharp peak having a small temporal width appears on the chromatogram, a qualitative analysis may be performed using a mass spectrum at a measurement point (measurement time point) giving the top of the sharp peak.

A peak on a chromatogram is in many cases made less sharp or deformed by various factors, and hence it is difficult to strictly determine a measurement point giving a peak top. In preparation for such a case, a conventional data processing apparatus for a GC/MS or a LC/MS has a function of calculating an average mass spectrum obtained by averaging mass spectra at a plurality of measurement points (generally, about three to five points) near a peak top on a chromatogram (see Non-Patent Document 2).

In a GC/MS/MS or a LC/MS/MS including a tandem quadrupole mass spectrometer as a mass spectrometer, an analysis in a multiple reaction monitoring (MRM) measurement mode is frequently adopted for a quantitative analysis of a target compound. In the MRM measurement mode, an upstream quadrupole mass filter and a downstream quadrupole mass filter each allow only ions having a particular mass-to-charge ratio to pass therethrough, and ions that finally reach a detector are detected. The MRM measurement mode has an advantage that ions originating from a non-target component and ions originating from a target component, which cannot be separated by a chromatograph, can be separated from each other and that only the latter ions can be detected. In the MRM measurement mode, however, qualitative information cannot be obtained in a period other than retention time, and hence, even if an unknown component is contained in a sample, the component is difficult to identify.

In view of the above, in a conventional GC/MS/MS or LC/MS/MS, MRM measurement and scan measurement are alternately repeated at a time interval that is short enough to be regarded as practically the same time, whereby quantitative information obtained in the MRM measurement and qualitative information obtained in the scan measurement can be acquired in parallel. Unfortunately, the following problem arises in the case where the MRM measurement and the scan measurement are alternately repeated at such a short time interval.

That is, in the MRM measurement, ion selection is achieved by the quadrupole mass filters at two stages, and hence the amount of ions that reach the detector is significantly smaller than that in the simple scan measurement in which ions simply pass through one of the quadrupole mass filters. Meanwhile, the MRM measurement in which a quantitative analysis is performed requires a high sensitivity. Accordingly, in general, in the case where the MRM measurement and the scan measurement are carried out at the same time (which is actually time-sharing as described above in a strict sense, but can be regarded as practically the same time in a longer time period), the gain of the detector is set to be high enough to obtain sufficient detection signals even with a relatively small amount of ions obtained in the MRM measurement. However, if the gain of the detector is high as described above, detection signals obtained in the scan measurement exceed the input range of an A/D converter, so that saturation of data frequently occurs.

If signal intensity data at a given mass-to-charge ratio is saturated in the scan measurement, the pattern of a mass spectrum at this time loses its shape (see FIGS. 3). When an average mass spectrum is calculated as described above in a predetermined time range near a peak top on a chromatogram, if mass spectra used for this average calculation include such a mass spectrum whose pattern loses its shape, the resultant average mass spectrum may not properly represent characteristics of a target compound. In this case, an incorrect compound may be selected in database searching, resulting in incorrect identification. Otherwise, a correct compound may not be selected in database searching, resulting in an identification miss.

BACKGROUND ART DOCUMENT

Patent Document

[Patent Document 1] Domestic Re-publication of PCT International Publication No. WO 2009/011011

Non-Patent Document

[Non-Patent Document 1] "Accurate Mass Measurement of High-Concentration Sample using LCMS-IT-TOF, Technical Report No. 27", [online], Shimadzu Corporation, [Searched on Nov. 18, 2010], Internet.

[Non-Patent Document 2] "GCMS Solution, Operation Q&A, Q: how to perform an averaging process on mass spectra (Inquiry No. 0620)", Shimadzu Corporation, [Searched on Feb. 6, 2012], Internet.

DISCLOSURE OF THE INVENTION

Problems to be Solved by the Invention

The present invention has been developed to solve the aforementioned problems.

The first objective thereof is to provide a mass analysis data processing apparatus capable of: reducing an influence of saturation of a peak intensity of a mass spectrum (including an $MS^n$ spectrum) through data processing without depending on addition and control of hardware; and obtaining with high accuracy a mass-to-charge ratio corresponding to a saturated peak.

The second objective of the present invention is to provide a mass analysis data processing apparatus capable of creating with high accuracy, even in the case where the concentration of a sample component is high and where saturation of a peak intensity occurs on a mass spectrum, an extracted ion chromatogram at a mass-to-charge ratio of ions originating from the component.

The third objective of the present invention is to provide a mass analysis data processing apparatus capable of obtaining an average mass spectrum that properly represents characteristics of a target compound, to thereby improve the precision of a qualitative analysis.

Means for Solving the Problems

A first aspect of the present invention aimed at achieving the first and second objectives is a mass analysis data processing apparatus that processes data collected by a mass spectrometer, including:

a) a peak waveform estimating section for estimating, for a peak waveform having a saturated peak top on a mass spectrum based on the data, a peak waveform shape without the saturation on a basis of data in a slope portion of a bottom of the peak waveform; and b) an approximate spectrum creating section for creating a mass spectrum using the peak waveform shape estimated by the peak waveform estimating section, instead of the peak having the saturated peak top.

In the mass analysis data processing apparatus according to the first aspect of the present invention, the mass spectrometer that acquires the processing target data is not particularly limited, and examples thereof include a time-of-flight mass spectrometer, a quadrupole mass spectrometer, a (magnetic) sector mass spectrometer, and a FT-ICR mass spectrometer. In particular, the present invention is suitable for a mass spectrometer with high mass resolution and high mass accuracy, such as the time-of-flight mass spectrometer. Further, the present invention may be applied to a hybrid apparatus (for example, IT-TOF, triple-quadrupole, or Q-TOF) including a plurality of mass spectrometers in combination. Further, in the present invention, the processing target data is data collected by practically performing, by the mass spectrometer, a mass scan operation over a predetermined mass range at least once.

If such data as described above is given to the mass analysis data processing apparatus according to the first aspect of the present invention, the peak waveform estimating section extracts a peak having a saturated peak top on a mass spectrum on the basis of the given data, and estimates a peak waveform shape without the saturation on the basis of a plurality of pieces of data included in a slope portion of the bottom of the extracted peak waveform, that is, the rising part and the falling part thereof. Specifically, fitting according to a multidimensional expression such as a two-dimensional expression or fitting according to Gaussian distribution (the normal distribution) can be used to estimate a peak waveform shape. The approximate spectrum creating section creates an approximate mass spectrum using the peak waveform shape estimated by the peak waveform estimating section, instead of the peak having the saturated peak top on the original mass spectrum. That is, the peak top is not saturated on the approximate mass spectrum created by the approximate spectrum creating section.

For a peak having an unsaturated peak top on the original mass spectrum, the approximate mass spectrum is the same as the original mass spectrum. Only for a peak having a saturated peak top on the original mass spectrum, a peak having an approximate shape obtained through estimation is reflected in the approximate mass spectrum. Because an ideal peak shape on a mass spectrum should follow the normal distribution, the position of the peak top of a peak having an approximate shape is significantly close to the position of the peak top that is assumed not to be saturated. Accordingly, with the use of such an approximate mass spectrum, the accuracy of the mass-to-charge ratio of each peak is enhanced, and the accuracy of fitting of an isotope pattern and comparison with monoisotopic mass using a mass spectrum is also improved. Further, for example, if a centroid process is performed on such an approximate mass spectrum, a centroid peak with high accuracy can be obtained.

In the mass analysis data processing apparatus according to the first aspect of the present invention, the approximate mass spectrum created by the approximate spectrum creating section as described above can be displayed on a display screen. Preferably, the approximate mass spectrum may be displayed using, for example, different line colors or line types such that a peak waveform portion based on the estimation of the peak waveform estimating section or the entire peak including the peak waveform portion is discriminable from other portions. Further, a saturated peak waveform obtained in actual measurement may also be displayed together with an approximate peak obtained through estimation on the approximate mass spectrum.

This enables an operator to know that the peak is actually saturated and that the displayed peak is based on not a result of the actual measurement but the estimation. The operator can thus take appropriate action such as diluting the sample and remeasuring it, as needed (for example, in the case where results based on not the estimation but the actual measurement need to be obtained).

Further, in the case where the mass analysis data processing apparatus according to the first aspect of the present invention is configured to process data collected by a chromatograph mass spectrometer, the mass analysis data processing apparatus may further include a chromatogram creating section for creating a chromatogram (extracted ion chromatogram) at a particular mass-to-charge ratio on a basis of a mass spectrum that is created by the spectrum creating section using an approximate peak waveform shape, the mass spectrum being obtained for each time point with a lapse of time of a chromatograph analysis.

According to this configuration, even in the case of measuring such a high-concentration sample that may cause peak saturation on an extracted ion chromatogram in conventional cases, an extracted ion chromatogram at a mass-to-charge ratio corresponding to each component of the sample can be more accurately displayed. As a result, the retention time in which a peak appears on the extracted ion chromatogram can be more accurately determined, and the accuracy of precision evaluation of component identification based on the retention time and identification using a mass spectrum can be improved. Further, the accuracy and reproducibility of a peak area value (integral value) are improved.

A second aspect of the present invention aimed at achieving the third objective is a mass analysis data processing apparatus that is a data processing apparatus that processes data obtained by a chromatograph mass spectrometer that analyzes a component in a sample temporally separated by a chromatograph by means of a mass spectrometer, the mass analysis data processing apparatus processing mass spectrum data repetitively obtained by performing scan measurement by means of the mass spectrometer, the mass analysis data processing apparatus including:

a) a saturated data discriminating section for discriminating, during the measurement, mass spectrum data containing data in which signal saturation has occurred or is likely to have occurred, among pieces of mass spectrum data at a plurality of measurement points within a predetermined time range or measurement point range, the pieces of mass spectrum data being obtained in a period in which a target component is introduced into the mass spectrometer; and b) an average mass spectrum creating section for creating an average mass spectrum using only pieces of mass spectrum data that are determined by the saturated data discriminating section not to contain data in which signal saturation has occurred or is likely to have occurred, among the pieces of mass spectrum data at the plurality of measurement points.

In one mode of the second aspect of the present invention, the mass analysis data processing apparatus may further include a flag storing section for determining, during the measurement, whether or not the mass spectrum data contains data in which signal saturation has occurred or is likely to have occurred, for each piece of mass spectrum data and for storing a saturation discrimination flag indicating a result of the determination in association with the mass spectrum data. The saturated data discriminating section may discriminate, during the measurement, mass spectrum data containing data in which signal saturation has occurred or is likely to have occurred, on a basis of the saturation discrimination flag stored in association with the mass spectrum data.

The chromatograph herein includes both a gas chromatograph and a liquid chromatograph. Further, the mass spectrometer herein includes an $MS^n$ mass spectrometer such as a tandem quadrupole mass spectrometer, as well as a general mass spectrometer. Accordingly, the scan measurement herein includes precursor ion scan measurement, product ion scan measurement, and neutral loss scan measurement for a MS/MS analysis, as well as simple scan measurement. The mass spectrum data herein includes $MS^2$ spectrum data obtained in these various kinds of scan measurement.

In the mass analysis data processing apparatus according to the second aspect of the present invention, for example, if the operator specifies an analysis target component and specifies a time range or a measurement point range for an averaging process of the target component on a chromatogram corresponding to the target component, the saturated data discriminating section discriminates, during the measurement, mass spectrum data containing data in which signal saturation has occurred or is likely to have occurred, among pieces of mass spectrum data at a plurality of measurement points within the specified time range or measurement point range. The average mass spectrum creating section excludes pieces of mass spectrum data that are determined to contain data in which signal saturation has occurred or is likely to have occurred, and averages, for each mass-to-charge ratio, signal intensity data in the time direction with the use of the other pieces of mass spectrum data, to thereby create an average mass spectrum. Accordingly, a mass spectrum that does not properly represent characteristics of the target component is not reflected in the average mass spectrum, and hence the average mass spectrum can be accurately calculated even in the case where the gain of a detector is high.

In the mass analysis data processing apparatus according to the second aspect of the present invention, data is excluded or used on a mass spectrum data basis. Normally, signal intensity is saturated in only pieces of data at an extremely small part of mass-to-charge ratios, in mass spectrum data. Accordingly, only data in which signal saturation has occurred or is likely to have occurred, in mass spectrum data, may be selectively excluded from the averaging process, instead of the mass spectrum data basis. Also in this case, the original objectives can be achieved.

In view of the above, a third aspect of the present invention aimed at achieving the third objective is a mass analysis data processing apparatus that is a data processing apparatus that processes data obtained by a chromatograph mass spectrometer that analyzes a component in a sample temporally separated by a chromatograph by means of a mass spectrometer, the mass analysis data processing apparatus processing mass spectrum data repetitively obtained by performing scan measurement by means of the mass spectrometer, the mass analysis data processing apparatus including:

a) a saturated data discriminating section for discriminating, during the measurement, data in which signal saturation has occurred or is likely to have occurred, among pieces of mass spectrum data at a plurality of measurement points within a predetermined time range or measurement point range, the pieces of mass spectrum data being obtained in a period in which a target component is introduced into the mass spectrometer; and b) an average mass spectrum creating section for creating an average mass spectrum using only pieces of data that are not determined by the saturated data discriminating section as data in which signal saturation has occurred or is likely to have occurred, among the pieces of mass spectrum data at the plurality of measurement points.

Effects of the Invention

With the mass analysis data processing apparatus according to the first aspect of the present invention, in the case of measuring a high-concentration sample, a mass spectrum with secured accuracy that is sufficient to some extent can be created without the need to: change control on measurement using a mass spectrometer; and perform remeasurement that requires dilution of the sample or the like, in order to avoid peak saturation on the mass spectrum. As a result, a mass-to-charge ratio can be obtained with high accuracy even for a high-concentration sample component, and fitting of an isotope peak pattern appearing on the mass spectrum and comparison with monoisotopic mass can be accurately performed, so that the precision of compound identification, compound structure estimation, and the like using the mass spectrum is improved. Further, quantitative properties using a peak area value (integral value) are also improved.

In the case where it is known before measurement start that the sample concentration is high, it is conventionally common practice to perform pretreatment such as dilution of a sample, in order to avoid peak saturation. Consequently, the concentration of another low-concentration component contained in the sample may become so low that the low-concentration component may not be detected. Hence, in the case where a plurality of components that are significantly different in concentration are contained in a sample, it is conventionally necessary to perform measurement a plurality of times in accordance with the respective component concentrations. In comparison, with the mass analysis data processing apparatus according to the first aspect of the present invention, on the basis of data obtained by performing measurement only once, it is possible to acquire one or more mass spectra in which peaks each having a peak top that is not saturated and has an intensity high enough to be observed appear correspondingly to the plurality of components. Accordingly, it is not necessary to perform measurement a plurality of times, and it is possible to prevent a detection miss of the low-concentration sample component in measurement performed only once. Further, a rough intensity ratio of the plurality of components and the like can be easily known by performing measurement only once.

In the case where the mass analysis data processing apparatus according to the first aspect of the present invention is applied to a chromatograph mass spectrometer such as a gas chromatograph mass spectrometer and a liquid chromatograph mass spectrometer, an influence of peak saturation on a mass spectrum caused by the fact that the concentration of a sample component is high can be reduced, and an extracted ion chromatogram and a total ion chromatogram can be created and displayed with high precision.

With the mass analysis data processing apparatus according to the second and the third aspects of the present invention, for example, even in the case where the gain of a detector of a mass spectrometer is excessively large and where data is thus saturated, an average mass spectrum having an accurate pattern, that is, a pattern that properly represents characteristics of a target component can be created and displayed on the basis of a plurality of measurement points near a chromatogram peak top. Accordingly, the precision of a qualitative analysis using the average mass spectrum can be secured.

BEST MODES FOR CARRYING OUT THE INVENTION

Figure 1:
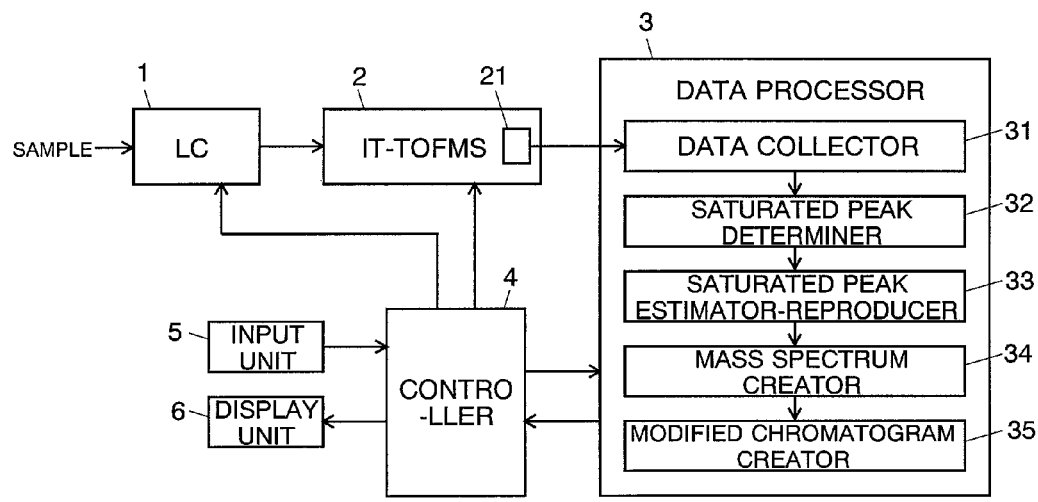
FIG. 1 is a schematic block configuration diagram of an embodiment (first embodiment) of a LC/MS system including a mass analysis data processing apparatus according to the present invention.
Figure 2:
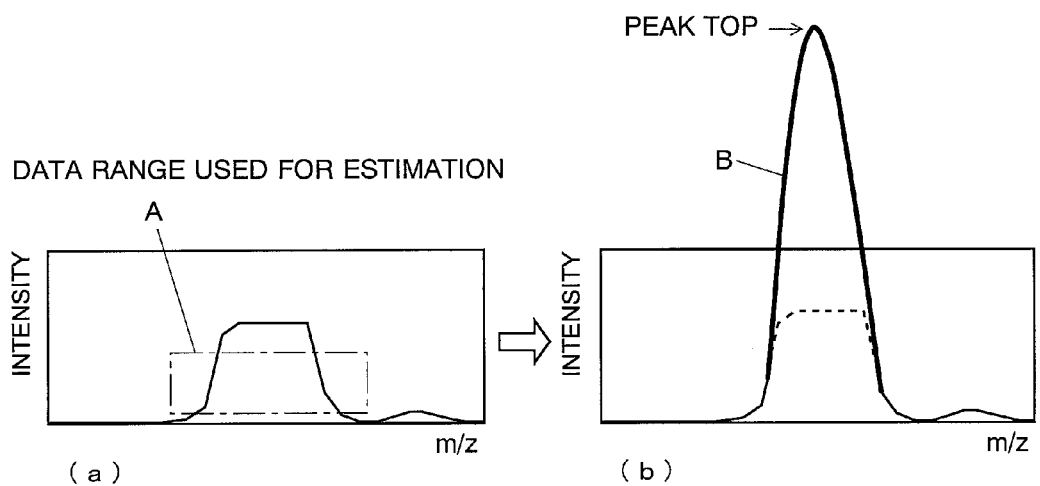
FIG. 2 is an explanatory diagram of a saturated peak estimation-reproduction processing operation in the LC/MS system of the first embodiment.
Figure 3:
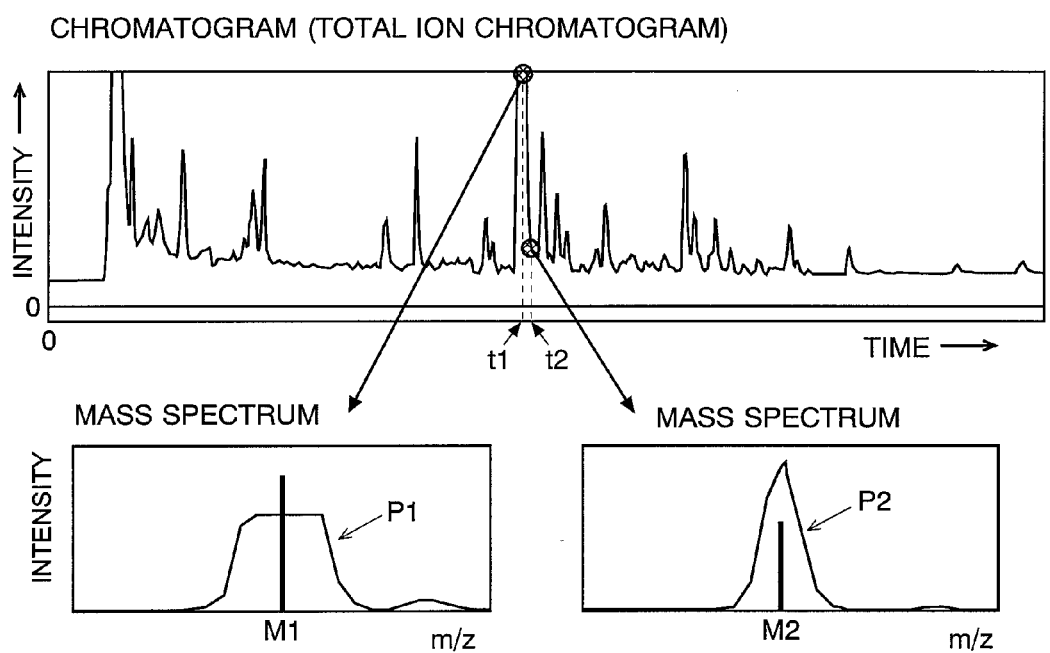
FIG. 3 is a diagram showing an example chromatogram and an example mass spectra for illustrating problems during measurement of a high-concentration sample.

An embodiment (first embodiment) of a LC/MS system including a mass analysis data processing apparatus according to the present invention is described below.
First Embodiment FIG. 1 is a schematic block configuration diagram of a LC/MS system of the first embodiment, and FIG. 2 is an explanatory diagram of a saturated peak estimation-reproduction processing operation in the LC/MS system of the first embodiment.

The LC/MS system includes: a liquid chromatograph (LC) 1 separating an analysis target sample for each component; an ion trap time-of-flight mass spectrometer (IT-TOFMS) 2 subjecting each separated component to mass spectrometry; a data processor 3 processing a detection signal obtained by a detector 21 included in the IT-TOFMS 2; a controller 4 controlling an operation of each unit; an input unit 5 for setting analysis conditions and the like; and a display unit 6 for displaying analysis results and the like.

Although not shown, the IT-TOFMS 2 includes an atmospheric-pressure ion source using an electrospray ionization method, an ion trap, and a time-of-flight mass spectrometer, in addition to the detector 21. The data processor 3 includes functional blocks such as a data collector 31, a saturated peak determiner 32, a saturated peak estimator-reproducer 33, a mass spectrum creator 34, and a modified chromatogram creator 35. Note that a large part of functions of the data processor 3 and the controller 4 can be implemented by a personal computer in which software for predetermined control and processing is installed.

In the LC/MS system of the present embodiment, if the analysis target sample is introduced into the LC 1, various components contained in the sample are temporally separated while passing through a column included in the LC 1, and are sequentially eluted from the outlet of the column. The sample components in the eluate introduced from the LC 1 into the IT-TOFMS 2 are ionized by the atmospheric-pressure ion source, and the generated ions are once stored in the ion trap. The ions that have been stored for a predetermined period of time receive a certain amount of energy in the ion trap, and are fed to the time-of-flight mass spectrometer. Then, the ions are separated in accordance with a mass-to-charge ratio (m/z) while flying through a flight space, and reach the detector 21. Such ion storage in the ion trap and mass spectrometry of the stored ions over a predetermined mass range by the time-of-flight mass spectrometer are repeated at a predetermined time interval, whereby the entirety or a large part of the sample components separated by the LC 1 are subjected to mass spectrometry in the IT-TOFMS 2.

A detection signal obtained by the detector 21 of the IT-TOFMS 2 is an intensity signal corresponding to the time of flight required for each ion to fly through the time-of-flight mass spectrometer. In the data processor 3, the data collector 31 converts a detection signal from the detector 21 of the IT-TOFMS 2 into a digital value, and further converts the time of flight corresponding to each detection signal into a mass-to-charge ratio, to thereby obtain profile data indicating a relation between the mass-to-charge ratio and the intensity signal. The data collector 31 stores the profile data into a data memory. Further, the data collector 31 calculates a signal intensity independent of a mass-to-charge ratio on the basis of, for example, data obtained correspondingly to a mass spectrometry operation in one cycle (that is, over a predetermined mass range), creates therefrom a total ion chromatogram, and feeds the total ion chromatogram to the controller 4. The controller 4 causes the display unit 6 to display the total ion chromatogram on its screen in substantially real time.

Next, description is given of a characteristic data processing operation in the data processor 3 that is performed during measurement of the sample or is performed as one of jobs in batch processing after the end of data collection in the measurement. If the saturated peak determiner 32 receives profile data over a predetermined mass range from the data collector 31, the saturated peak determiner 32 determines whether or not a peak having a saturated peak top exists on a mass spectrum created on the basis of the profile data. Specifically, for example, the saturated peak determiner 32 checks a value of each piece of data in a direction in which the mass-to-charge ratio becomes higher, to thereby find a pair of the rising part and the falling part of a peak. When data in a portion between paired rising part and falling part continues to have a substantially constant value for a predetermined period, the saturated peak determiner 32 can determined that the peak is saturated. As a matter of course, the method of detecting saturation of a peak top is not limited thereto.

In the case as shown in FIG. 2(a) where a peak having a saturated peak top exists, the saturated peak estimator-reproducer 33 estimates a peak shape (a waveform B in FIG. 2(b)) of the saturated portion on the basis of values of a plurality of pieces of data included in the rising part and the falling part (a range A in FIG. 2(a)) of the peak. It is reasonable to consider that the shape of a peak appearing on a mass spectrum follows the normal distribution, in an ideal state where a mobile phase supplied from the LC 1 has no influence, where deviation of a base line due to a change in analysis conditions does not occur, where various types of noise are not generated, or where non-target component in the sample have no influence. Accordingly, for example, the saturated peak estimator-reproducer 33 performs fitting with a Gaussian function using the plurality of pieces of data included in the rising part and the falling part of the peak, and thus can obtain a desired approximate peak shape.

In the case where a plurality of saturated peaks exist on one mass spectrum, the saturated peak estimator-reproducer 33 obtains an approximate peak waveform for each peak in such a manner as described above. The mass spectrum creator 34 receives data forming an approximate peak waveform estimated by the saturated peak estimator-reproducer 33, and creates a mass spectrum in which a saturated peak is replaced with the approximate peak waveform. Further, the mass spectrum creator 34 performs a centroid process on the mass spectrum in which the saturated peak is eliminated as described above, and thus calculates the barycentric position of the peak, to thereby obtain the mass-to-charge ratio of the peak.

Further, for every mass spectrum that is obtained with the lapse of time from injection of the sample into the LC 1, the modified chromatogram creator 35 creates an extracted ion chromatogram and a total ion chromatogram on the basis of a mass spectrum in which a saturated peak is replaced with its approximate peak as described above. Accordingly, the extracted ion chromatogram and the total ion chromatogram created at this time are little affected by the peak saturation in the profile data.

In response to a request from an operator through the input unit 5, the controller 4 causes the display unit 6 to display, on its screen, a mass spectrum created by the mass spectrum creator 34 as described above that does not have peak saturation and an extracted ion chromatogram or a total ion chromatogram created by the modified chromatogram creator 35 as described above that is little affected by peak saturation. The display unit 6 may display the mass spectrum such that the approximate peak obtained through estimation is discriminable from other peaks (that is, peaks based on actual measurement). For example, the approximate peak may be expressed using a different line color or line type. With this configuration, the operator can easily recognize that peak saturation has occurred, and can easily know which peak is based on estimation and may be slightly lower in the accuracy of a mass-to-charge ratio.

Moreover, when the data processor 3 performs a qualitative analysis (identification) or compound structure estimation, the data processor 3 uses a mass spectrum created by the mass spectrum creator 34 that does not have peak saturation. As a result, the accuracy of a mass-to-charge ratio corresponding to a peak is improved compared with the case of using the mass spectrum on which the peak is saturated as shown in FIG. 2(*a*). Hence, the accuracy of the qualitative analysis or the structure estimation itself is improved, and an identification miss and incorrect identification can be reduced in the qualitative analysis, for example. Meanwhile, when the data processor 3 performs a quantitative analysis, the data processor 3 uses an extracted ion chromatogram created by the modified chromatogram creator 35. The data processor 3 calculates an area value (integral value) of a peak corresponding to the retention time of a target component, and obtains a quantitative value from the area value. The accuracy of the peak area value itself is higher than that in conventional cases, and hence the accuracy of the quantitative analysis is improved.

In the first embodiment described above, the processing target is only a peak having a saturated peak top on a mass spectrum. Alternatively, in the case where the mass spectrometer is of $MS^n$ type as in a second embodiment to be described below, similar processing can also be performed on a peak having a saturated peak top on an $MS^n$ spectrum. Further, the present invention can be applied to processing on not only data obtained by a mass spectrometer upstream of which a chromatograph is connected but also data obtained by a mass spectrometer alone.

Second Embodiment

A GC/MS/MS system of another embodiment (second embodiment) including the mass analysis data processing apparatus according to the present invention is described below.

Figure 4:
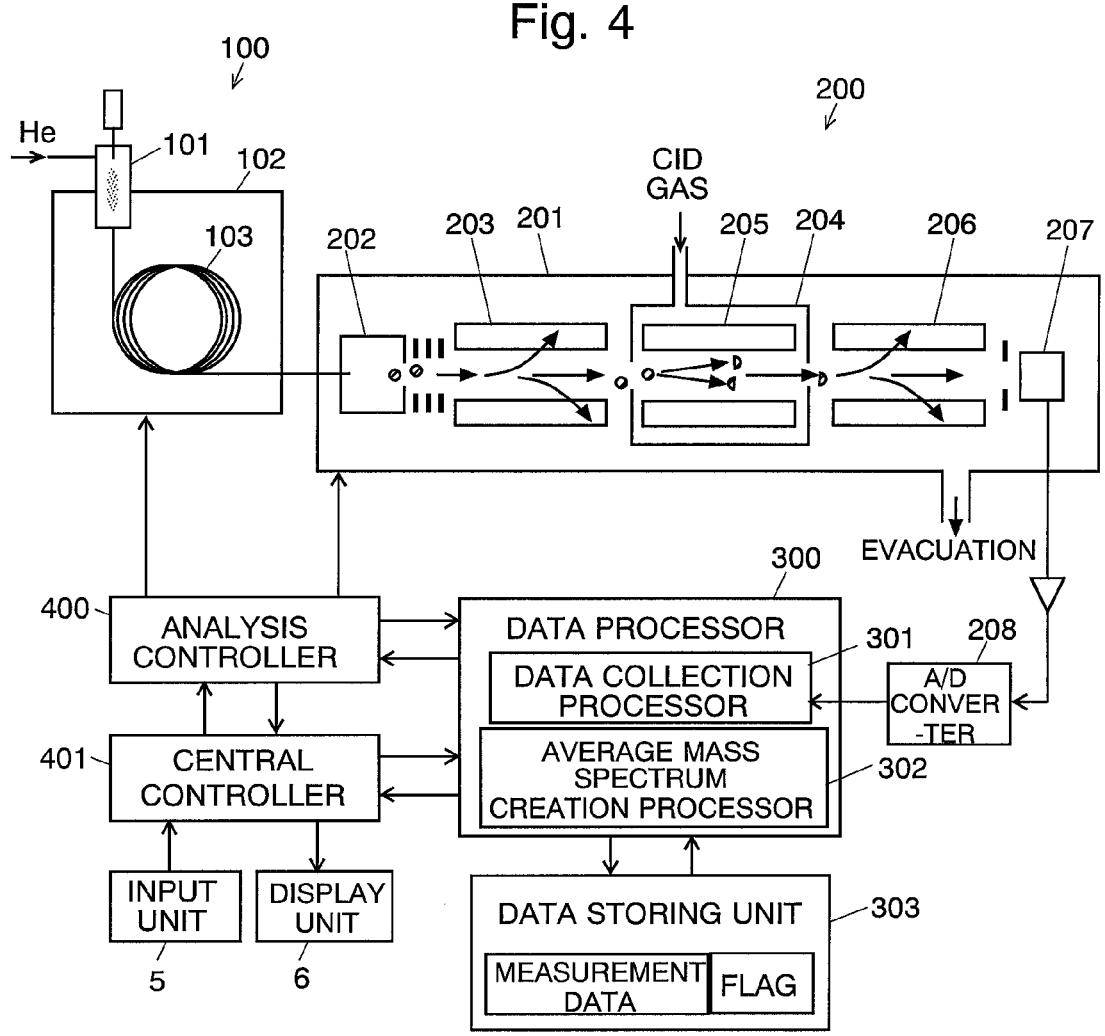
FIG. 4 is an overall configuration diagram of an embodiment (second embodiment) of a GC/MS/MS system to which the mass analysis data processing apparatus according to the present invention is applied.

FIG. 4 is a schematic block configuration diagram of the GC/MS/MS system of the second embodiment.

The GC/MS/MS system includes a gas chromatograph (GC) 100 and a tandem quadrupole mass spectrometer 200, in order to analyze a sample and collect data. In the GC 100, a carrier gas such as helium is supplied to a column 103 through a sample evaporation chamber 101 at a constant flow rate. The column 103 is installed in a column oven 102, and the temperature of the column 103 is regulated so as to be kept constant or follow a predetermined temperature profile. If a slight amount of sample solution is injected into the sample evaporation chamber 101 at a predetermined timing, the sample solution evaporates in a short time, and is introduced into the column 103 while being carried by the carrier gas flow. Then, various components contained in the sample are separated while passing through the column 103, and flow out of the outlet of the column 103 at different points in time.

The tandem quadrupole mass spectrometer 200 includes, in a vacuum chamber 201, an ion source 202 using an electronic ionization (EI) method or a chemical ionization (CI) method, an upstream quadrupole mass filter 203, a collision cell 204 in which a multipole ion guide 205 is installed, a downstream quadrupole mass filter 206, and a detector 207. Examples of the detector 207 include an electron multiplier combined with a conversion dynode.

At the time of performing a MS/MS analysis, a collision-induced dissociation (CID) gas is supplied into the collision cell 204. The sample gas flowing out of the outlet of the column 103 in the GC 100 is introduced into the ion source 202, and component molecules in the sample gas are ionized. Among the generated various ions, only ions having a particular mass-to-charge ratio are allowed to pass through the upstream quadrupole mass filter 203, and are introduced into the collision cell 204. The ions come into contact with the CID gas in the collision cell 204, and the CID gas helps the dissociation of the ions, so that various product ions are generated. Only product ions having a particular mass-to-charge ratio are allowed to pass through the downstream quadrupole mass filter 206, and reach the detector 207 to be detected thereby.

The tandem quadrupole mass spectrometer 200 can also perform a normal mass spectrometry, that is, measurement in a selected ion monitoring (SIM) measurement mode or a scan measurement mode. In the normal mass spectrometry, a CID gas is not introduced into the collision cell 204, and any of the upstream quadrupole mass filter 203 and the downstream quadrupole mass filter 206 allows ions to simply pass therethrough (ion selection is not performed in any of the mass filters), whereby the ions are not dissociated.

The detector 207 outputs a detection signal corresponding to the amount of ions that have reached the detector 207. The detection signal is converted into digital data by an A/D converter 208, and is inputted to a data processor 300. The data processor 300 includes a data collection processor 301 as its functional block, and causes the data collection processor 301 to store data into a data storing unit 303. The data processor 300 further includes an average mass spectrum creation processor 302 performing an operation characteristic of the present embodiment. The units of the GC 100 and the tandem quadrupole mass spectrometer 200 are controlled by an analysis controller 400, and operations of the analysis controller 400 and the data processor 300 are comprehensively controlled by a central controller 401. The input unit 5 and the display unit 6 are connected as user interfaces to the central controller 401.

Note that hardware resources of the entirety or a part of the data processor 300, the analysis controller 400, and the central controller 401 are a personal computer, and functions of the data processor 300, the analysis controller 400, and the central controller 401 can be implemented by executing special software for control and processing installed in advance in the computer.

The tandem quadrupole mass spectrometer 200 can perform measurement in various modes. The MRM measurement mode is generally used to perform a quantitative analysis of a known target component. In the MRM measurement mode, voltage applied to each of the upstream quadrupole mass filter 203 and the downstream quadrupole mass filter 206 is set such that each filter selects ions having a predetermined mass-to-charge ratio, whereby particular fragment ions originating from the target component are detected. In this measurement mode, ions originating from non-target component that are introduced into the ion source 202 at the same time as the target component can be removed, and hence noise caused by such undesired ions can be prevented. In the simple MRM measurement mode, however, unknown components contained in the sample are not detected. Hence, in the case where it is necessary to know in parallel what components are contained in the sample, a measurement method in which the MRM measurement mode and the scan measurement mode are alternately repeated at a short time interval is frequently adopted.

In the MRM measurement mode, ion selection is performed in both the upstream quadrupole mass filter 203 and the downstream quadrupole mass filter 206, and hence the amount of ions from the target component that finally reach the detector 207 is significantly smaller than the amount of the ions generated by the ion source 202. In contrast, in the scan measurement mode without ion dissociation, ion selection is performed in only one of the quadrupole mass filters 203 and 206, and hence the amount of ions that originate from the target component and reach the detector 207 is larger than that in the MRM measurement mode. Accordingly, if the gain of the detector 207 is set to be high enough to detect ions with a high sensitivity during the MRM measurement, a detection signal is excessively large and thus exceeds the input range of the A/D converter 208 during the scan measurement, so that outputted data may be digitally saturated. In view of this, even in the case where data collected in measurement is saturated, the GC/MS/MS system of the present embodiment performs characteristic data processing in order to avoid a harmful influence on results obtained by processing the saturated data.

Figure 5:
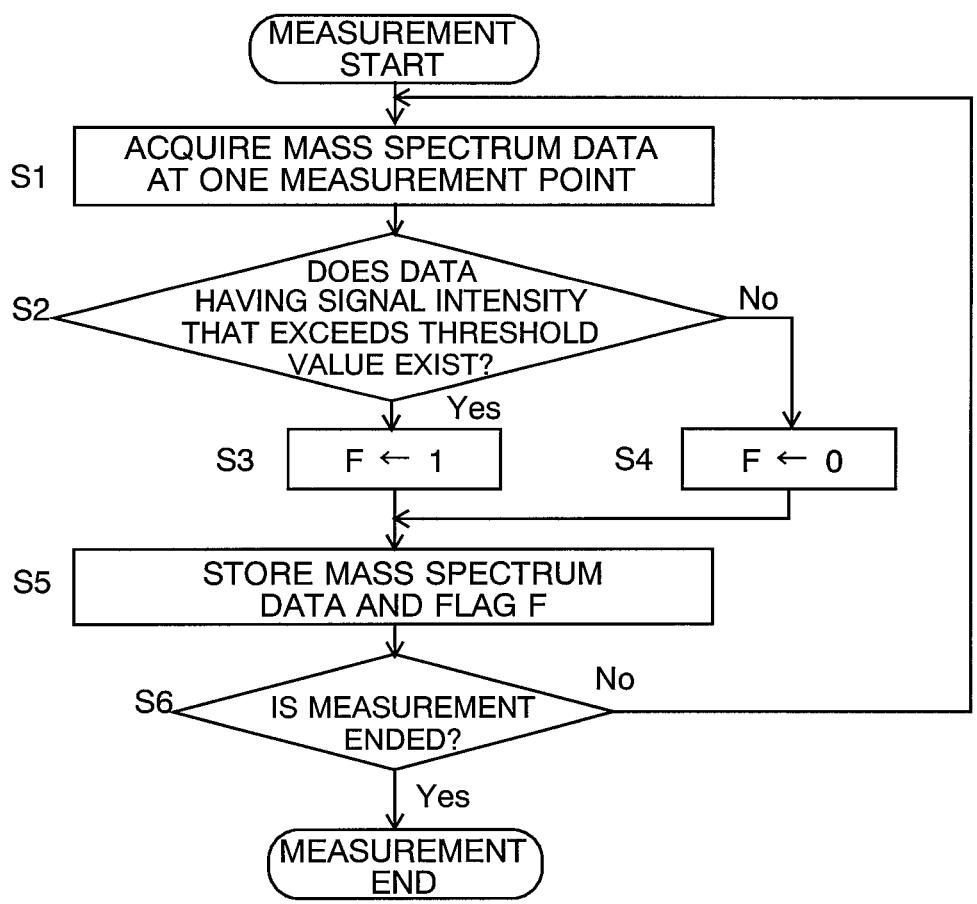
FIG. 5 is a flow chart showing a controlling and processing operation during measurement data collection in a GC/MS/MS of the second embodiment.

Next, the characteristic data processing operation performed by the GC/MS/MS system of the present embodiment is described. First, with reference to FIG. 5, description is given of a processing operation that is performed mainly by the data collection processor 301 when mass spectrum data is collected in the scan measurement mode. FIG. 5 is a flow chart showing a controlling and processing operation during data collection in the scan measurement mode. Note that, in the case where the MRM measurement and the scan measurement are alternately repeated as described above, the processing shown in FIG. 5 may be performed only in a scan measurement period, and data collection similar to conventional processing may be performed in a MRM measurement period.

When the measurement is started, the analysis controller 400 applies voltage to the upstream quadrupole mass filter 203 or the downstream quadrupole mass filter 206 such that a mass scan operation over a predetermined mass-to-charge ratio range is repeated. A detection signal that is obtained by the detector 207 in one cycle of mass scan operation is converted into a digital value by the A/D converter 208, and is fed to the data collection processor 301. Data obtained in one cycle of mass scan operation is mass spectrum data at a given measurement point (measurement time point). If mass spectrum data at a given measurement point is obtained (Step S1), the data collection processor 301 determines whether or not data having a signal intensity that exceeds a threshold value exists in the mass spectrum data (Step S2).

As described above, if a detection signal outputted from the detector 207 is excessively large, the detection signal may exceed the input range of the A/D converter 208. In the case where the detection signal exceeds the input range and where output data is thus saturated, the data value becomes equal to or more than a predetermined value, and hence the threshold value may be set accordingly, that is, may be set so as to enable detection of the state where saturation has occurred or where saturation is highly likely to have occurred. If data having a signal intensity that exceeds the threshold value exists in the mass spectrum data, a saturation discrimination flag F corresponding to this mass spectrum data is set to "1" (Step S3). If data having a signal intensity that exceeds the threshold value does not exist therein, the saturation discrimination flag F is set to "0" (Step S4). Then, the acquired mass spectrum data and the saturation discrimination flag F are stored into the data storing unit 303 in association with each other (Step S5). Note that the mass spectrum data stored into the data storing unit 303 may be profile data corresponding to a predetermined mass-to-charge ratio, and may be mass spectrum data obtained by performing a centroid process on the profile data.

Then, whether or not the measurement is ended is determined by, for example, determining whether or not a predetermined measurement time has passed from the measurement start (Step S6). If the measurement is not ended, the processing returns to Step S1, and collection of data obtained in the scan measurement is continued. Through repetition of Steps S1 to S5 described above, mass spectrum data is stored into the data storing unit 303 in association with its saturation discrimination flag F, for each mass scan operation from the measurement start to the measurement end.

Some types of A/D converters have a function of detecting an input range overflow. In the case where such an A/D converter can be used, whether or not data having a saturated signal intensity exists in mass spectrum data can be determined on the basis of an overflow detection output. Further, whether or not data after A/D conversion is saturated may be determined by detecting the level of an analog detection signal inputted to the A/D converter 208.

Figure 6:
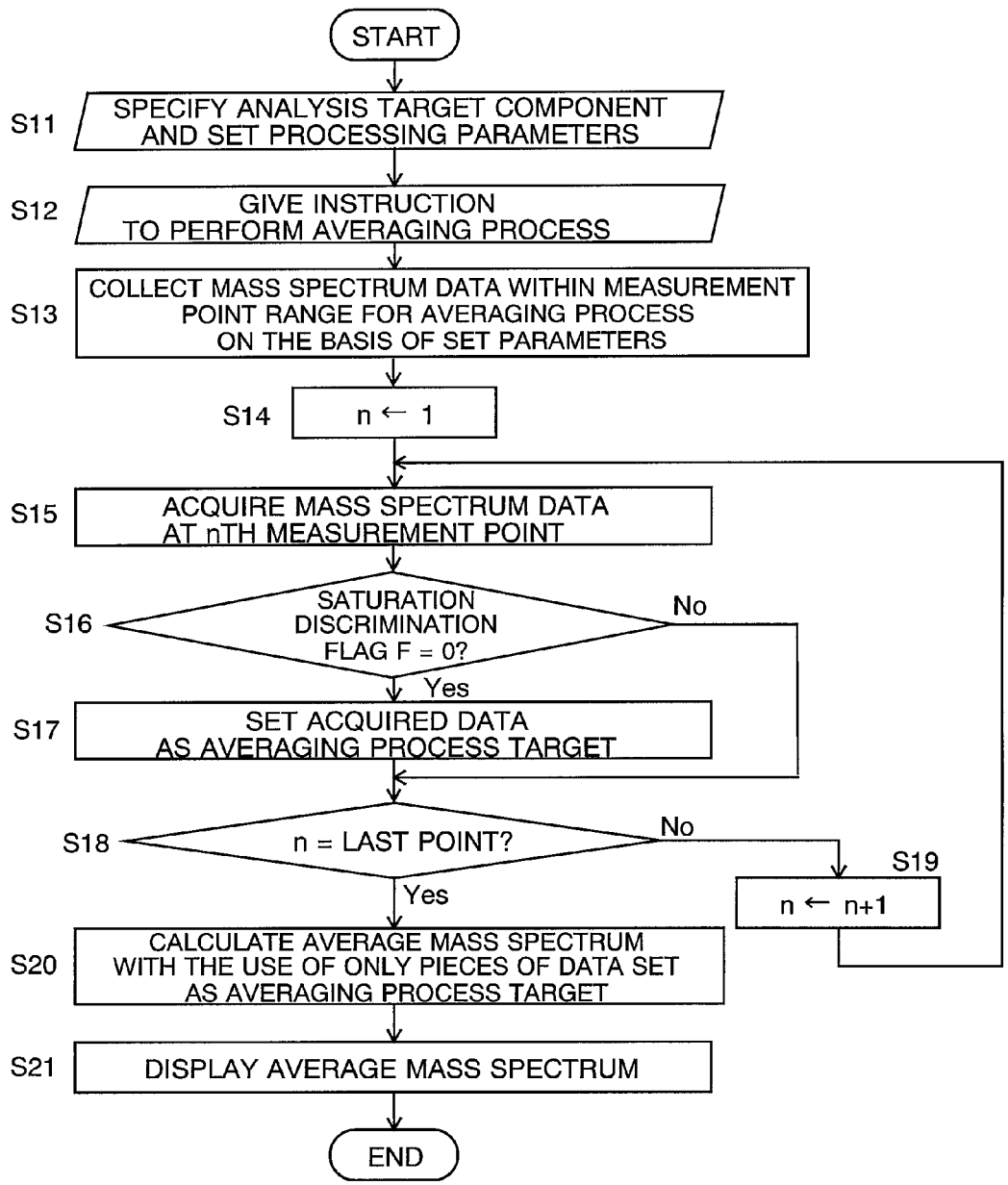
FIG. 6 is a flow chart showing a controlling and processing operation during average mass spectrum creation in the GC/MS/MS of the second embodiment.
Figure 7:
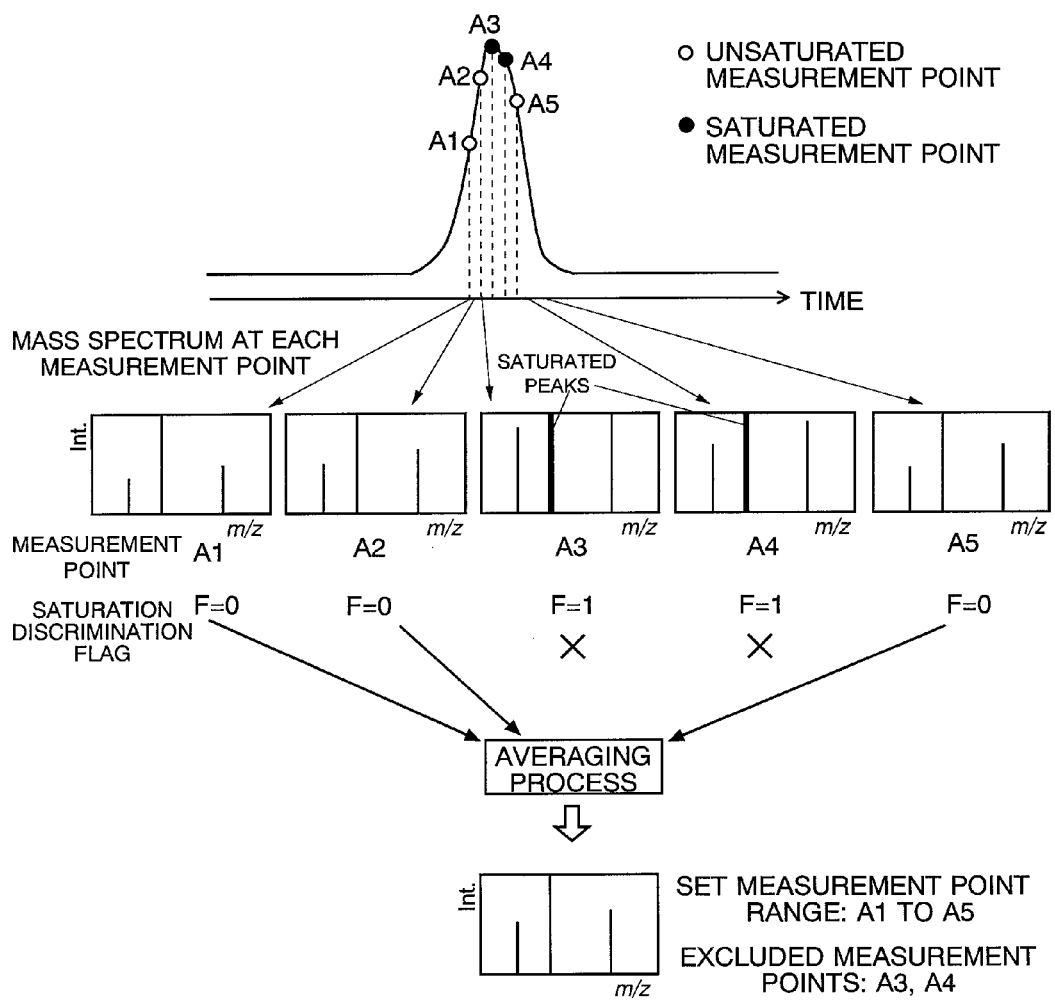
FIG. 7 is a schematic diagram for illustrating an average mass spectrum creating operation in the GC/MS/MS of the second embodiment.

Next, with reference to FIG. 6 and FIG. 7, description is given of a processing operation that is performed when an average mass spectrum is created and displayed in the state where mass spectrum data is stored in the data storing unit 303 as described above. FIG. 6 is a flow chart showing an average mass spectrum creation processing operation, and FIG. 7 is a schematic diagram for illustrating an average mass spectrum creating operation.

The operator performs a predetermined operation on the input unit 5, to thereby display, on the screen of the display unit 6, a total ion chromatogram which is created on the basis of data collected in the scan measurement mode performed on a target sample. The operator specifies a chromatogram peak to be subjected to an averaging process, on the total ion chromatogram, and sets parameters (processing conditions) necessary for the averaging process (Step S11). The parameters include, for example, the number of measurement points used for the averaging and the time range therefor. The time range for the averaging process may be specified by performing a graphic operation such as dragging on the chromatogram.

If the operator gives an instruction to perform the process (Step S12), the average mass spectrum creation processor 302 receives the instruction, and reads, out of the data storing unit 303, mass spectrum data within the measurement point range specified in the parameters and the like, together with its saturation discrimination flag (Step S13). It is assumed, as an example, that the number of measurement points as the averaging process target is "5" for a chromatogram peak as shown in FIG. 7. At this time, because the measurement points as the averaging process target are A1 to A5 near the peak top, mass spectrum data obtained at each of the measurement points A1 to A5 is read out of the data storing unit 303 together with its saturation discrimination flag.

Subsequently, the average mass spectrum creation processor 302 sets a variable n to 1 (Step S14), and acquires mass spectrum data at the $n^{th}$ measurement point (Step S15). In the example of FIG. 7, the mass spectrum data at the first measurement point A1 is first acquired. Next, it is determined whether or not the value of the saturation discrimination flag F associated with this mass spectrum data is "0" (Step S16). If the saturation discrimination flag F is "0", the mass spectrum data at this time can be determined not to contain data with signal saturation. Hence, the acquired mass spectrum data is set as the averaging process target (Step S17), and the processing proceeds to Step S18. On the other hand, if the saturation discrimination flag F is "1", the mass spectrum data at this time is highly likely to contain data with signal saturation. Hence, Step S17 is skipped, and the processing proceeds to Step S18. That is, the mass spectrum data at this time is not set as the averaging process target.

In Step S18, it is determined whether or not the variable n is the last point within the measurement point range. If the variable n is not the last point, the variable n is incremented by one (Step S19), and the processing returns to Step S15. In the example of FIG. 7, the measurement point A5 is the last point within the measurement point range. Hence, Steps S15 to S19 are repeated four times. Then, next time the processing reaches Step S18, the variable n is determined as the last point, and the processing proceeds to Step S20. Through repetition of Steps S15 to S19, the mass spectrum data at each of the measurement points A1 to A5 is acquired. Assuming that the saturation discrimination flag F given during the measurement is "1" for the measurement points A3 and A4, the two pieces of mass spectrum data at the measurement points A3 and A4 are not set as the averaging process target. In other words, only the pieces of mass spectrum data at the three measurement points A1, A2, and A5 are used for the averaging process.

With the use of only the pieces of mass spectrum data at the measurement points selected in accordance with their respective saturation discrimination flags, the average mass spectrum creation processor 302 calculates an average value of intensity data for each mass-to-charge ratio, and creates an average mass spectrum (Step S20). Then, the display unit 6 displays the created average mass spectrum on its screen, and also displays, on its screen, the measurement points used for the averaging process (in the above example, A1, A2, and A5) and the measurement points excluded from the averaging process (in the above example, A3 and A4) in a discriminable manner (Step S21). The two kinds of measurement point may be displayed using text information as shown in FIG. 7, or may be displayed graphically, for example, by providing marks indicating the measurement points on the chromatogram curve with colors different from each other.

As described above, in the GC/MS/MS system of the second embodiment, when an average mass spectrum for a given component is created and displayed, mass spectrum data containing data that is likely to have a saturated signal intensity is excluded, and hence the precision of the average mass spectrum is improved.

In the second embodiment, a saturation discrimination flag is given on a mass spectrum basis. Hence, even if only the signal intensity for a given mass-to-charge ratio is saturated in a mass spectrum, the mass spectrum containing this data is excluded from an averaging process. Alternatively, for example, if a saturation discrimination flag is given on a mass-to-charge ratio basis or a smaller mass-to-charge ratio range basis, not the entire mass spectrum data but only data with signal saturation can be excluded from the averaging process target. In the example of FIG. 7, data with signal saturation is found only in one portion at each of the measurement points A3 and A4. Hence, for the mass-to-charge ratio of this data, the data at each of the measurement points A3 and A4 may be excluded from the averaging process target. For the mass-to-charge ratio of data other than these data, the pieces of data at all the measurement points may be set as the averaging process target.

Further, in the second embodiment, the characteristic processing is performed on mass spectrum data obtained in simple scan measurement. Such processing as described above can also be applied to a measurement mode for collecting mass spectrum data, that is, a precursor ion scan measurement mode, a product ion scan measurement mode, a neutral loss scan measurement mode, and the like for a MS/MS analysis.

Further, the second embodiment is the GC/MS/MS system, but may be a LC/MS/MS system, and may be a LC/MS and a GC/MS as in the first embodiment, as a matter of course.

It is evident that the above-mentioned embodiments are given as mere examples of the present invention, and any change, modification, or addition appropriately made within the spirit of the present invention will fall within the scope of claims of the present application.

EXPLANATION OF NUMERALS

1 . . . Liquid Chromatograph (LC)
2 . . . Ion Trap Time-of-flight Mass Spectrometer (IT-TOFMS)
21, 207 . . . Detector
3, 300 . . . Data Processor
31 . . . Data Collector
32 . . . Saturation Peak Determiner
33 . . . Saturation Peak Estimator-Reproducer
34 . . . Mass Spectrum Creator
35 . . . Modified Chromatogram Creator
4 . . . Controller
5 . . . Input Unit
6 . . . Display Unit
100 . . . Gas Chromatograph (GC)
101 . . . Sample Evaporation Chamber
102 . . . Column Oven
103 . . . Column
200 . . . Tandem Quadrupole Mass Spectrometer
201 . . . Vacuum Chamber
202 . . . Ion Source
203 . . . Upstream Quadrupole Mass Filter
204 . . . Collision Cell
205 . . . Multipole Ion Guide
206 . . . Downstream Quadrupole Mass Filter
208 . . . A/D Converter
301 . . . Data Collection Processor
302 . . . Average Mass Spectrum Creation Processor
303 . . . Data Storing Unit
400 . . . Analysis Controller
401 . . . Central Controller

The invention claimed is:
1. A mass analysis data processing apparatus that processes data collected by a mass spectrometer, comprising:

a) a peak waveform estimating section for estimating, for a peak waveform having a saturated peak top on a mass spectrum based on the data, a peak waveform shape without the saturation on a basis of data in a slope portion of a bottom of the peak waveform; and b) an approximate spectrum creating section for creating a mass spectrum using the peak waveform shape estimated by the peak waveform estimating section, instead of the peak having the saturated peak top.

2. The mass analysis data processing apparatus according to claim 1, wherein the peak waveform estimating section estimates the peak waveform shape without the saturation according to Gaussian distribution on the basis of the data in the slope portion of the bottom of the peak waveform having the saturated peak top.

3. The mass analysis data processing apparatus according to claim 2, the mass analysis data processing apparatus processing data collected by a chromatograph mass spectrometer including the mass spectrometer as a detector of a chromatograph, the mass analysis data processing apparatus further comprising a chromatogram creating section for creating a chromatogram at a particular mass-to-charge ratio on a basis of a mass spectrum that is created by the spectrum creating section using a virtual peak waveform shape, the mass spectrum being obtained for each time point with a lapse of time of a chromatograph analysis.

4. The mass analysis data processing apparatus according to claim 1, further comprising a display processing section for displaying, on a display screen, the mass spectrum created by the approximate spectrum creating section such that a peak waveform portion based on the estimation of the peak waveform estimating section or the entire peak including the peak waveform portion is discriminable from other portions.

5. The mass analysis data processing apparatus according to claim 4, the mass analysis data processing apparatus processing data collected by a chromatograph mass spectrometer including the mass spectrometer as a detector of a chromatograph, the mass analysis data processing apparatus further comprising a chromatogram creating section for creating a chromatogram at a particular mass-to-charge ratio on a basis of a mass spectrum that is created by the spectrum creating section using a virtual peak waveform shape, the mass spectrum being obtained for each time point with a lapse of time of a chromatograph analysis.

6. The mass analysis data processing apparatus according to claim 1, the mass analysis data processing apparatus processing data collected by a chromatograph mass spectrometer including the mass spectrometer as a detector of a chromatograph, the mass analysis data processing apparatus further comprising a chromatogram creating section for creating a chromatogram at a particular mass-to-charge ratio on a basis of a mass spectrum that is created by the spectrum creating section using a virtual peak waveform shape, the mass spectrum being obtained for each time point with a lapse of time of a chromatograph analysis.

7. A mass analysis data processing apparatus that is a data processing apparatus that processes data obtained by a chromatograph mass spectrometer that analyzes a component in a sample temporally separated by a chromatograph by means of a mass spectrometer, the mass analysis data processing apparatus processing mass spectrum data repetitively obtained by performing scan measurement by means of the mass spectrometer, the mass analysis data processing apparatus comprising:

a) a saturated data discriminating section for discriminating, during the measurement, mass spectrum data containing data in which signal saturation has occurred or is likely to have occurred, among pieces of mass spectrum data at a plurality of measurement points within a predetermined time range or measurement point range, the pieces of mass spectrum data being obtained in a period in which a target component is introduced into the mass spectrometer; and b) an average mass spectrum creating section for creating an average mass spectrum using only pieces of mass spectrum data that are determined by the saturated data discriminating section not to contain data in which signal saturation has occurred or is likely to have occurred, among the pieces of mass spectrum data at the plurality of measurement points.

8. The mass analysis data processing apparatus according to claim 7, further comprising a flag storing section for determining, during the measurement, whether or not the mass spectrum data contains data in which signal saturation has occurred or is likely to have occurred, for each piece of mass spectrum data and for storing a saturation discrimination flag indicating a result of the determination in association with the mass spectrum data, wherein the saturated data discriminating section discriminates, during the measurement, mass spectrum data containing data in which signal saturation has occurred or is likely to have occurred, on a basis of the saturation discrimination flag stored in association with the mass spectrum data.

9. A mass analysis data processing apparatus that is a data processing apparatus that processes data obtained by a chromatograph mass spectrometer that analyzes a component in a sample temporally separated by a chromatograph by means of a mass spectrometer, the mass analysis data processing apparatus processing mass spectrum data repetitively obtained by performing scan measurement by means of the mass spectrometer, the mass analysis data processing apparatus comprising:

a) a saturated data discriminating section for discriminating, during the measurement, data in which signal saturation has occurred or is likely to have occurred, among pieces of mass spectrum data at a plurality of measurement points within a predetermined time range or measurement point range, the pieces of mass spectrum data being obtained in a period in which a target component is introduced into the mass spectrometer; and b) an average mass spectrum creating section for creating an average mass spectrum using only pieces of data that are not determined by the saturated data discriminating section as data in which signal saturation has occurred or is likely to have occurred, among the pieces of mass spectrum data at the plurality of measurement points.

* * * * *